United States Patent [19]

Kato

[11] 4,253,330

[45] Mar. 3, 1981

[54] FUEL CONSUMPTION MEASURING APPARATUS

[75] Inventor: Yoshiaki Kato, Fujisawa, Japan

[73] Assignee: Nissan Motor Company, Limited, Japan

[21] Appl. No.: 40,423

[22] Filed: May 18, 1979

[30] Foreign Application Priority Data

Jun. 5, 1978 [JP] Japan ................................. 53/66652

[51] Int. Cl.³ ............................................... G01F 9/00
[52] U.S. Cl. ..................................... 73/113; 73/119 A
[58] Field of Search ...................... 73/113, 114, 119 A; 261/DIG. 74

[56] References Cited

U.S. PATENT DOCUMENTS

| | | | |
|---|---|---|---|
| 1,987,981 | 1/1935 | Tice | 261/DIG. 74 |
| 3,252,322 | 5/1966 | Pring | 73/113 |
| 3,714,823 | 2/1973 | Wilkens et al. | 73/113 |
| 4,012,948 | 3/1977 | Kuno et al. | 73/113 |

FOREIGN PATENT DOCUMENTS

| | | |
|---|---|---|
| 2403562 | 8/1975 | Fed. Rep. of Germany . |
| 2534941 | 2/1976 | Fed. Rep. of Germany . |
| 2633698 | 2/1977 | Fed. Rep. of Germany . |
| 1564743 | 4/1969 | France . |

*Primary Examiner*—Jerry W. Myracle
*Attorney, Agent, or Firm*—Lowe, King, Price & Becker

[57] ABSTRACT

A fuel consumption measuring apparatus for internal combustion engines is disclosed which includes a control chamber provided at its inlet with a fuel injection system connected to the fuel supply system. A fuel level sensor is located at a predetermined position within the control chamber for detecting the level of the fuel in the control chamber with respect to the predetermined position. A control circuit is associated with the sensor for actuating the fuel injection system so as to allow injection of fuel into the control chamber when the fuel level is below the predetermined position. The number of fuel injections is counted and indicated by an indicating unit.

10 Claims, 5 Drawing Figures

FUEL CONSUMPTION MEASURING APPARATUS

BACKGROUND OF THE INVENTION

1. Field of the Invention

This invention relates to an apparatus for providing an accurate measurement of fuel consumption made in an internal combustion engine including a carburetor supplied with fuel through a fuel supply system.

2. Description of the Prior Art

Because of a recent increasing demand for fuel economy motor vehicles, an increasing need has been recognized for an accurate measurement of fuel consumption made in an internal combustion engine over various engine operating conditions. An attempt has been made to determine fuel consumption indirectly from a reduced amount of fuel in a fuel tank. However, this attempt measures only average fuel consumption in a certain period of time with very poor measuring accuracy. Another attempt has also been made to directly measure fuel consumption using a fuel flow meter located in the fuel supply system. However, this requires an expensive and undurable fuel flow meter.

SUMMARY OF THE INVENTION

Therefore, it is an object of the present invention to provide an inexpensive and durable fuel consumption measuring apparatus which can measure fuel consumption with a great accuracy.

It is another object of the present invention to provide a fuel consumption measuring apparatus mountable on motor vehicles, which makes it possible to measure an amount of fuel consumed during a total running time or an amount of fuel consumed during a desired period of running time to indicate the result.

In accordance with the present invention, there is provided a fuel consumption measuring apparatus for use with an internal combustion engine including a carburetor and a fuel supply system adapted to provide fuel at a regulated pressure. The apparatus comprises a control chamber connected at its outlet to the carbureter and provided at its inlet with fuel injection means connected to the fuel supply system. A fuel level sensor is located at a predetermined position within the control chamber. The sensor has two different conditions, one appearing when the level of the fuel charged in the control chamber is below the predetermined position and the other appearing when the fuel level is at or above the predetermined position. The sensor is connected to a control circuit which includes a pulse signal generator and is responsive to the one condition of the sensor for rendering the pulse signal generator operative to actuate the fuel injection means so as to allow injection of the pressure-regulated fuel into the control chamber through the fuel injection means and is responsive to the other condition of the sensor for rendering the pulse signal generator inoperative to return the fuel injection means to its initial state so as to stop the fuel injection. Also provided is an indicator unit associated with the control circuit for counting the number of fuel injections and indicating the result.

Other objects and features of the present invention will become apparent upon reading the appended claims in conjunction with the following detailed description and the attached drawings.

DESCRIPTION OF THE PREFERRED EMBODIMENT

Figure 1:
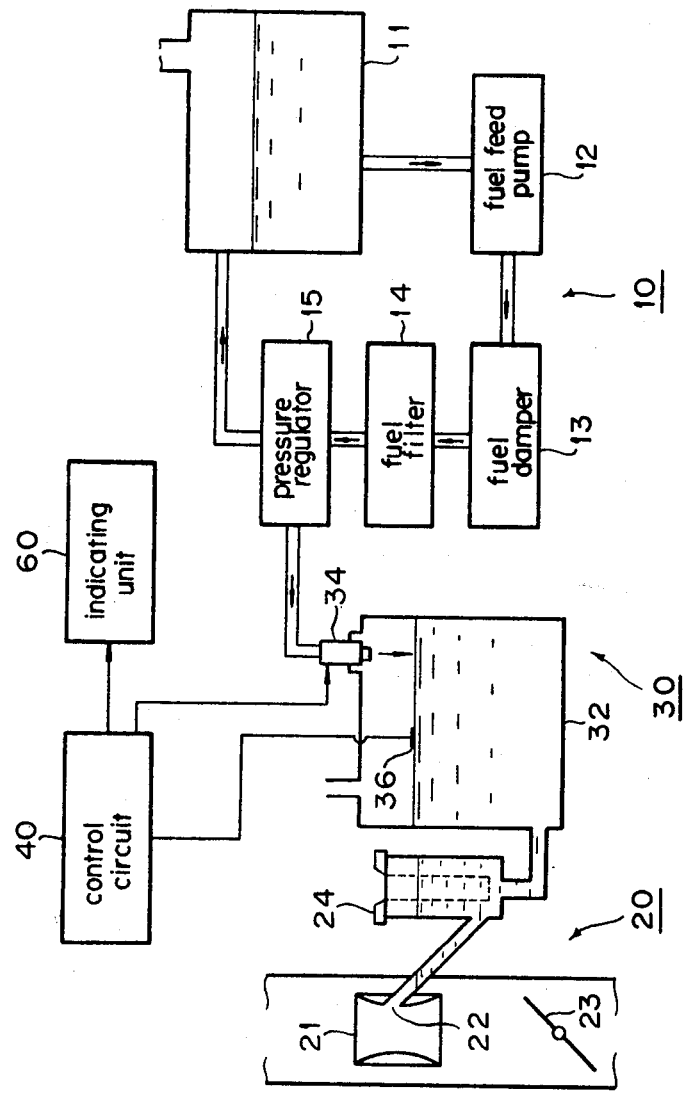
FIG. 1 is a schematic illustration of a fuel consumption measuring apparatus embodying the principles of the present invention.

In the drawings FIG. 1 illustrates the principles of the present invention as applied to an internal combustion engine including a fuel supply system indicated generally at 10 and a carbureter indicated generally at 20. The fuel supply system 10 is of a conventional type in which fuel flow occurs from a fuel tank 11 through a fuel feed pump 12, a fuel damper 13 and a fuel filter 14 to a fuel pressure regulator 15 which regulates the pressure of the fuel delivered from the fuel filter 14. From the fuel pressure regulator 15, a part of the fluid is returned into the fuel tank 11 and the pressure-regulated remainder thereof is fed to a fuel injection valve to be described later. The carbureter 20 is also of a conventional type which includes a venturi 21, a main nozzle 22, a throttle valve 23 and an air bleeder 24 for production of air-fuel mixture.

Designated generally at 30 is a fuel consumption measuring apparatus made in accordance with the present invention which comprises a control chamber 32 connected at its outlet to the main air bleeder 24 and fitted at its inlet with a normally closed fuel injection valve 34 connected to the pressure regulator 15. When opened, the fuel injection valve 34 allows direct injection of pressure-regulated fuel into the control chamber 32 so as to raise the level of the fuel charged in the control chamber 32. The control chamber 32 is shown as having a structure substantially similar to that of a float chamber currently used in normal carburetor arrangements except that no float is provided and instead a fuel level sensor 36 comprising such as, for example, a bridge circuit including a thermistor is provided at a predetermined position within the control chamber 32. The sensor 36 is adapted to have two different conditions, one established when the fuel level is at or above the predetermined position at which the sensor 36 is located so as to wet the sensor 36 with the fuel and the other established when it is below the predetermined position and the sensor 36 is exposed to air.

The fuel consumption measuring apparatus also comprises a control circuit 40 connected to the fuel level sensor 36 and an indicator unit 60 associated with the control circuit 40, both of which will be more fully described below. Suffice it to say that the control circuit 40 is designed to be responsive to the other sensor condition appearing when the fuel level becomes below the predetermined position for opening the fuel injection valve 34 for a predetermined period of time this allows injection of the pressure-regulated fuel into the control chamber 32 thereby raising the fuel level to the predetermined position. When the fuel level arrives at the predetermined position, the control circuit 40 will close the fuel injection valve 34 in response to the one sensor condition. It is to be noted that the amount (Q) of the fuel injected through the fuel injection valve 34 into the control chamber 32 each time the fuel injection valve 34 is opened is constant since the injected fuel has a constant pressure. Thus, by counting the number of openings of the fuel injection valve 34, i.e., the number of fuel injections, it is possible to know the total fuel consumption as Q×N. The result is indicated by the indicating unit 60.

Although the control chamber 32 is located in place of a float chamber currently used in common carbureter arrangements in the above embodiment, it is to be noted that it may be interposed between the float chamber and the pressure regulator, i.e., in the fuel supply system.

Figure 2:
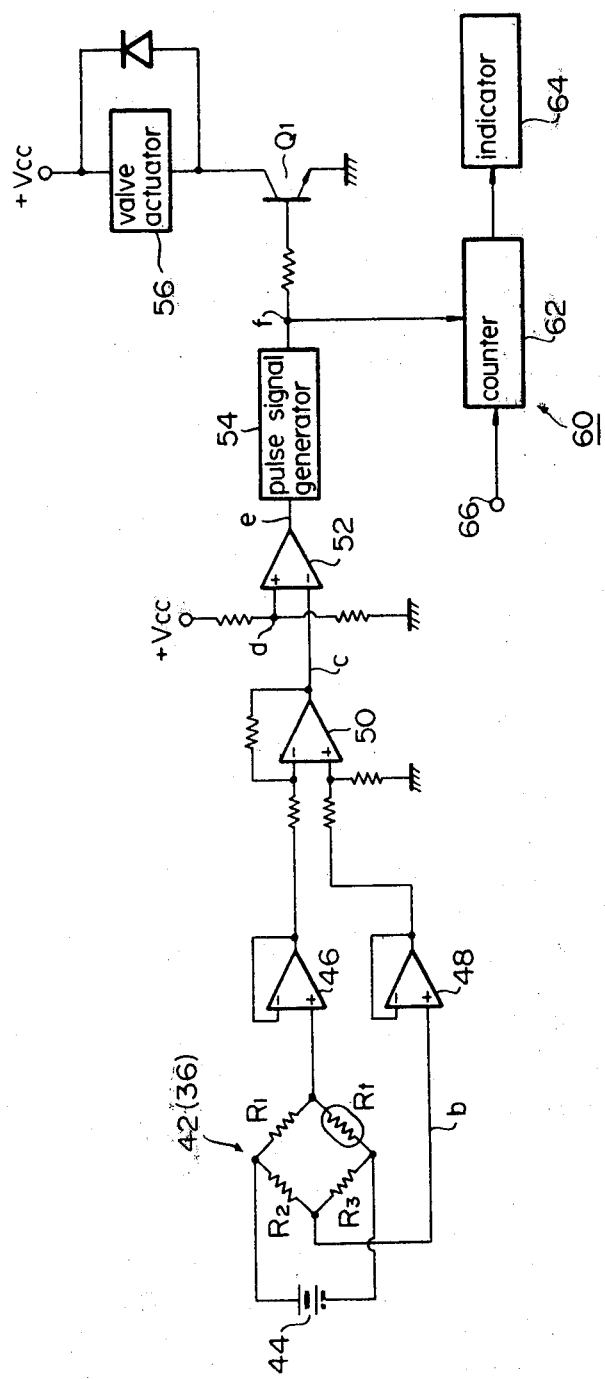
FIG. 2 is a circuit diagram illustrating a control circuit for use in the measuring apparatus of the present invention.

Referring now to FIG. 2, there is illustrated an example of the control circuit of the present invention. The control circuit 40 comprises a bridge circuit 42 (corresponds to the fuel level sensor 36 of FIG. 1) made up of three resistors R1 to R3 and a thermistor Rt. The bridge circuit 42 is powered by a power supply 44. The outputs a and b of the bridge circuit 42 are respectively connected through buffer circuits 46 and 48 to the input terminals of a differential operational amplifier 50, the output c of which is connected to one of the input terminals of a comparator 52 having the other input terminal connected to a reference voltage d for comparison of the output c with the reference voltage d.

Figure 3:
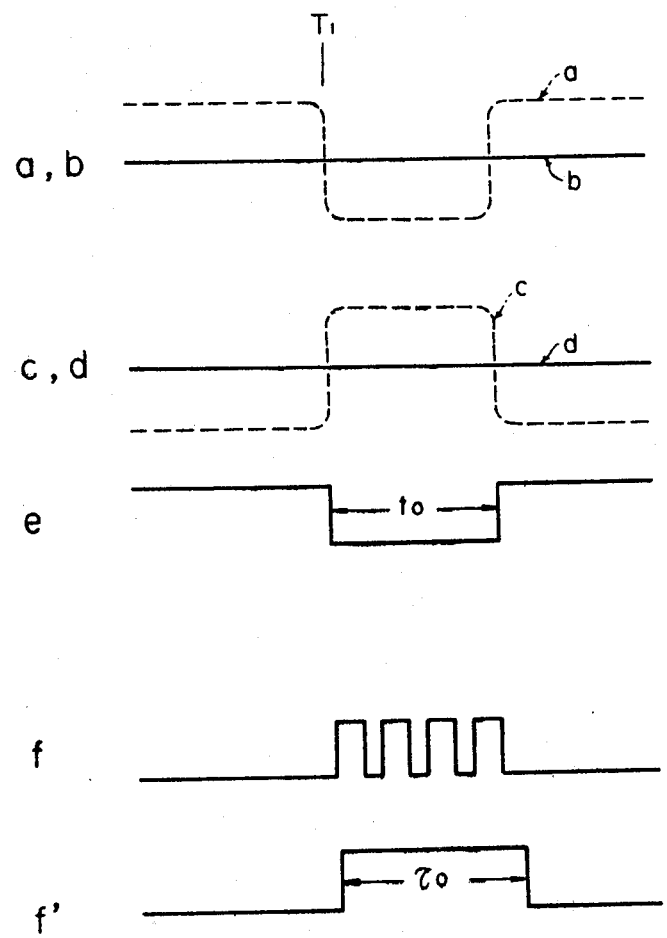
FIG. 3 is a voltage waveform timing diagram used to explain the operation of the measuring apparatus of the present invention.

The operation of the control circuit of the present invention will now be described in connection with FIG. 3 which shows typical time sequences for the magnitude of the voltages appearing at the respective points indicated by the like reference letters of FIG. 2. As long as the level of the fuel charged in the control chamber 32 is at or above the predetermined position and the thermistor Rt is wet with the fuel, the output voltage a is higher than the output voltage b and thus the output c of the differential operational amplifier 50 is at its low level. This causes the output e of the comparator 52 to remain at its high level. Under this condition, the fuel injection valve 34 is held closed.

On the other hand, when the fuel level falls below the predetermined position due to fuel consumption and the thermistor Rt is exposed to air (which is indicated at $T_1$ in FIG. 3), the temperature of thermistor Rt increases and thus its resistance decreases. The result is that the output voltage a becomes lower than the output voltage b and thus the output c of the differential operational amplifier 50 becomes higher than the reference voltage d so as to change the output e of the comparator 52 to its low level. The leading edge of the output voltage e of the comparator 52 triggers the pulse signal generator 54, causing the pulse signal generator 54 to provide a train of operational pulses f for period of time to during which the output of the comparator 52 is at low level. That is, the pulse signal generator 54 will continue to provide the train of operational pulse while the fuel level sensor 36 comprising the bridge circuit 42 including the thermistor Rt remains in the other condition. The pulses f render the transistor $Q_1$ conductive so as to energize the valve actuator 56, thereby intermittently opening the fuel injection valve 34 for the time period to. This allows injection of pressure-regulated fuel through the fuel injection valve 34 into the control chamber 32. As soon as the fuel level arrives at the predetermined position so that the fuel wets the thermistor Rt, the voltages a, c, and e will return to their respective initial levels to render the pulse signal generator 54 inoperative, whereby the valve actuator 56 is deenergized and thus the fuel injection valve 34 is closed.

The pulse generator 54 may be designed to provide an operational pulse f′ having a wide pulse width $\tau_0$ for a predetermined period of time slightly longer than the time to during which the output e of the comparator 52 is held at its low level. In this instance, the amount of fuel to be injected once should be determined to cause the fuel level to arrive at the predetermined position. That is, the fuel injection valve 34 and the width of the pulse signal f′ are selected to permit the engine to have a supply of fuel sufficient for its maximum output.

The indicating unit 60 includes a counter 62 for counting the number of occurences of the signal f or f′, and an indicator 64 for indicating the result of the counter 62. The counter 62 is provided with a reset signal input terminal 66 for permitting the operator to reset the counter 62 at a desired time thereby to measure an amount of fuel which will be consumed for a desired period of time. As will be obvious from the foregoing, with the fuel consumption measuring apparatus mountable on motor vehicles according to the present invention, it will be possible to measure an amount of fuel consumed for a total running time or an amount of fuel consumed for a desired period of running time.

Figure 4A:
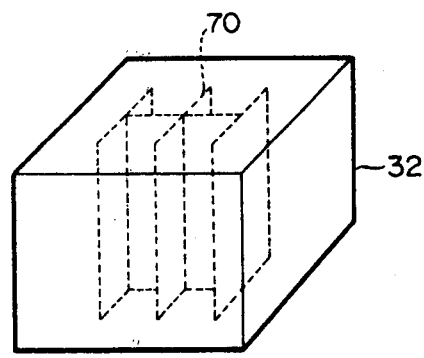
FIGS. 4A and 4B are perspective views showing two different advantageous forms of the control chamber.
Figure 4B:
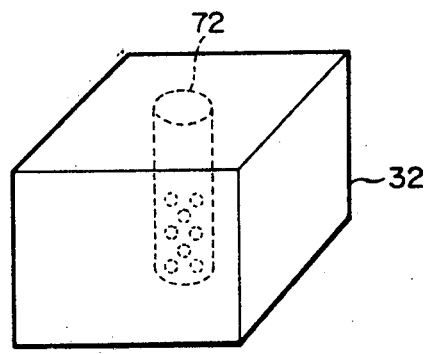

FIG. 4A illustrates an advantageous form of the present invention in which a baffle assembly 70 is placed in the control chamber 32 and FIG. 4B illustrates another advantageous form of the present invention in which a cylinder 72 formed in its periphery with a number of holes is placed in the control chamber 32 and the fuel level sensor 36 is provided within the cylinder 72. These arrangements permit accurate fuel level detection even under vehicle inclined conditions. The control chamber 32 may be cylindrical with the fuel level sensor 36 positioned on its center axis of the cylinder.

The circuit of FIG. 2 using digital principles is easily associated with a travelling distance meter so as to monitor fuel consumption rate.

It is, therefore, apparent from the foregoing that there has been provided, in accordance with the present invention, a durable and reliable fuel consumption measuring apparatus for making a very accurate measurement of fuel consumption. While this invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A fuel consumption measuring apparatus for use with an internal combustion engine including a carburetor and a fuel supply system adapted to provide fuel of a regulated pressure, said apparatus comprising a control chamber connected at its outlet to said carbureter and provided at its inlet with fuel injection means connected to said fuel supply system a fuel level sensor located at a predetermined position within said control chamber and having two different conditions, one established when the level of the fuel charged in said control chamber is below the predetermined position and the other established when the fuel level is at or above the predetermined position a control circuit including a pulse signal generator and responsive to the beginning of the one condition of said sensor for rendering said pulse signal generator operative to actuate said fuel injection means for a predetermined period of time, and an indicator unit associated with said control circuit for counting the number of occurences of the fuel injection and indicating the result.

2. A fuel consumption measuring apparatus as set forth in claim 1, in which said pulse signal generator provides a train of operational pulses while said sensor remains in the one condition.

3. A fuel consumption measuring apparatus as set forth in claim 2, in which the amount of fuel to be injected once is determined to cause the fuel level to arrive at said predetermined position.

4. A fuel consumption measuring apparatus as set forth in claim 1, in which said pulse signal generator provides an operational pulse for a time longer than the time during which said sensor is maintained in the one condition.

5. A fuel consumption measuring apparatus as set forth in claim 1, in which said sensor comprises a bridge circuit including a thermistor and having an output pulse signal generator responsive to the output of said bridge circuit.

6. A fuel consumption measuring apparatus as set forth in claim 5, in which said control circuit further comprises a transistor operative to the pulse supplied from said pulse signal generator, and a valve actuator which is energized by the conduction of said transistor to open said fuel injection means.

7. A fuel consumption measuring apparatus as set forth in claim 6, in which said indicator unit includes a counter for counting the number of occurrences of pulses supplied from said pulse signal generator, and an indicator for indicating the result of said counter.

8. A fuel consumption measuring apparatus as set forth in claim 7, in which said counter comprises a reset signal input terminal for permitting operators to reset said counter at a desired time thereby to measure an amount of fuel which will be consumed for a desired period of time.

9. A fuel consumption measuring apparatus as set forth in claim 1, in which a baffle assembly is placed in said control chamber.

10. A fuel consumption measuring apparatus as set forth in claim 1, in which a cylinder formed in its periphery with a number of holes is placed in said control chamber and said fuel level sensor is provided within said cylinder.

* * * * *